United States Patent [19]
Verschuur

[11] 3,865,136
[45] Feb. 11, 1975

[54] OIL/WATER PIPELINE INLET WITH OIL SUPPLY VIA A LARGE CHAMBER

[76] Inventor: Eke Verschuur, 3 Badhuisweg, Amsterdam, Netherlands

[22] Filed: Apr. 22, 1974

[21] Appl. No.: 463,007

Related U.S. Application Data
[62] Division of Ser. No. 217,486, Jan. 13, 1972, Pat. No. 3,822,721.

[30] Foreign Application Priority Data
Apr. 29, 1971 Netherlands.................. 7105971

[52] U.S. Cl.................. 137/604, 137/13
[51] Int. Cl................... F17d 1/16
[58] Field of Search ............ 137/13, 604; 417/198; 138/41

[56] References Cited
UNITED STATES PATENTS

| | | | |
|---|---|---|---|
| 3,502,103 | 3/1970 | Verschuur | 137/13 X |
| 3,572,391 | 3/1971 | Hirsch | 138/41 X |
| 3,659,962 | 3/1972 | Zink | 417/198 X |

Primary Examiner—Alan Cohan
Attorney, Agent, or Firm—Fredrik Marlowe

[57] ABSTRACT

An inlet piece for a pipeline for the transport of a viscous liquid surrounded by an annular layer of a liquid with a lower viscosity, which liquids are entirely or substantially insoluble with respect to each other, composed of a first chamber, provided with at least one inlet and with an exit for the viscous liquid, a second chamber, provided with at least one inlet for the liquid with a lower viscosity and with an annular outlet for that liquid which is so positioned as to surround the exit for the viscous liquid, and a rotation-symmetrical connecting piece for the connection to the pipeline; and a process for the transport of those liquids through a pipeline.

1 Claim, 6 Drawing Figures

PATENTED FEB 11 1975
3,865,136
SHEET 1 OF 2
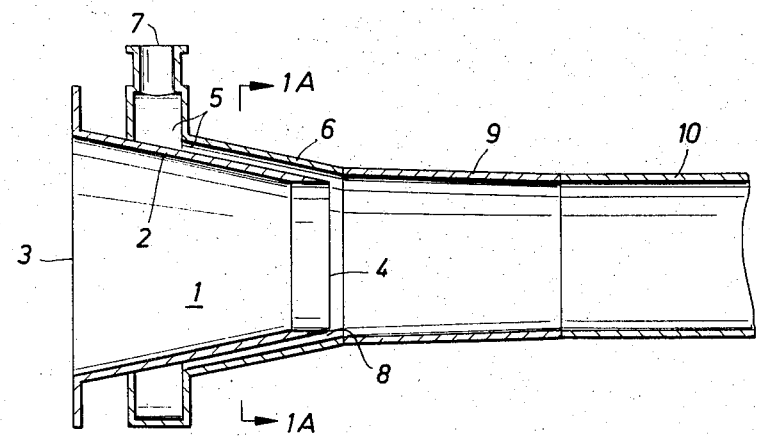
FIG. 1
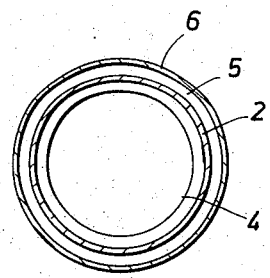
FIG. 1A
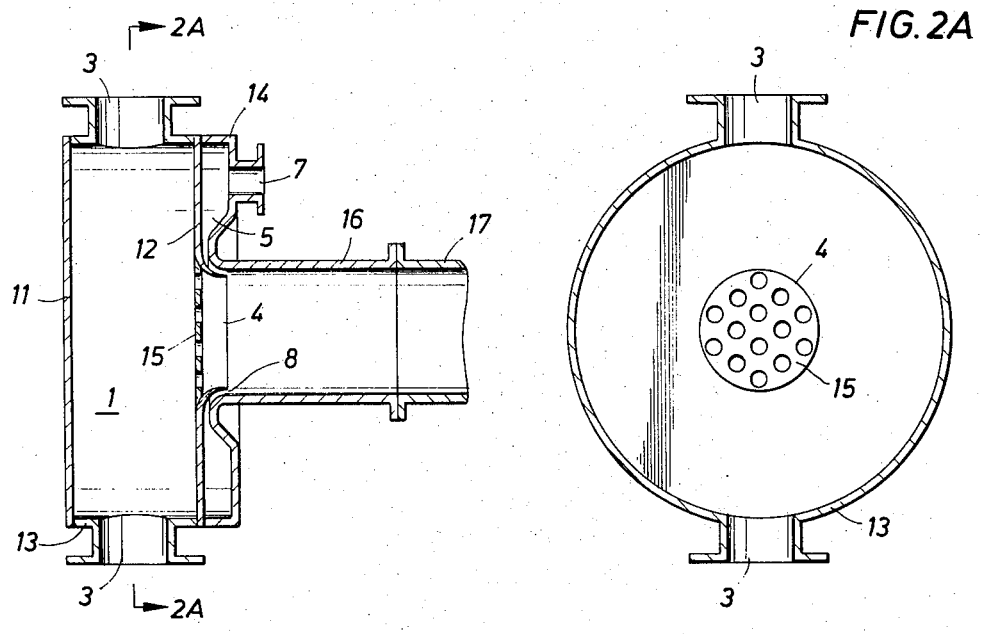
FIG. 2
FIG. 2A

3,865,136

OIL/WATER PIPELINE INLET WITH OIL SUPPLY VIA A LARGE CHAMBER

This is a division, of application Ser. No. 217,486, filed Jan. 13, 1972 now U.S. Pat. No. 3,822,721 granted July 9, 1974.

BACKGROUND OF THE INVENTION

The term liquid is here taken to include liquids having non-Newtonian properties. The viscous liquid will hereinafter be referred to as oil, the liquid with a lower viscosity as water.

A known application of the above-mentioned process is the transport of oil through pipelines, water or a liquid phase substantially consisting of water being used as the liquid with a lower viscosity. Here the oil moves in the form of a long plug through the center of the pipeline, the water forming a layer between the oil and the wall of the pipeline. Since the friction between water and wall is much lower than that between oil and wall, the resistance to flow is considerably smaller than in the pumping of oil only. In this way it is even possible for very stiff oils or oils of temperatures lying below the pour point to be transported through a pipeline.

In this connection it is of great importance that no oil drops are present in the water besides the central oil plug. Oil drops dispersed in the water layer would considerably increase the thickness of that layer necessary to separate the central oil plug from the wall. As a result a smaller part of the volume transported would consist of oil, while in addition the separation between water and oil after transport would be more difficult.

It has been found that the formation of oil drops occurs there where water and oil are added one to the other; oil drops then form more readily when the viscosity of the oil is lower.

As a result of the presence of the annular outlet for the water round about the exit for oil, immediately after oil and water having been added one to the other an annular layer of water is formed around the oil. The formation of oil drops is in the first place determined by the local average velocity of flow of the oil. The higher that velocity, the greater the chance of drops being formed.

In the present process of transport the average velocity of flow in the pipeline is as a rule higher than 0.5 m/s. This lower limit is related to the phenomenon that at lower flow velocities there is a risk of the oil plug penetrating through the annular layer of water and contacting the wall of the pipeline, which is undesirable.

Oil flow velocities higher than 0.5 m/s, however, often give rise to the formation of drops when the annular layer of water is formed. Peripheral effects in the velocity profile of the oil play an important role here.

SUMMARY OF THE INVENTION

The invention provides a process and means by which at high flow velocities, too, water and oil can be introduced into the pipeline in such a way that the desired flow pattern develops without oil drops being formed.

The invention therefore relates to an inlet piece and process for the use thereof as described hereinbefore, where a. the exit for the viscous liquid is circular in cross section and the perpendicular on the plane of that cross section, in the center thereof, coincides with the center line of the pipeline, b. of the first chamber the dimension in directions perpendicular to the perpendicular mentioned under (a) is larger than the diameter of the exit, and c. the cross-sectional area of the exit for the viscous liquid is at least 50 percent of the cross-sectional area of the pipeline.

By selecting the dimensions of the first chamber in directions perpendicular to the perpendicular on the exit such that they are larger than the diameter of that exit, at the location of the exit a flow pattern can always be obtained in which the volocity distribution is so uniform that peripheral effects in the volocity profile are very small and, at the flow velocities applied in the transport through pipelines, the formation of drops is avoided. Here it is important that the flow of oil to the exit is as nearly unimpeded as possible, which can be attained when the cross-sectional area available for the flow through the first chamber is at least as large as the cross-sectional area of the exit.

BRIEF DESCRIPTION OF THE DRAWING

FIG. 1 shows a longitudinal section and cross section through an inlet piece, the first chamber of which is bounded by a wall having the shape of the curved surface of a cone.

FIG. 2 represents an embodiment in which the first chamber is cylindrical, likewise shown in longitudinal section and in cross section.

FIGS. 1A, 2A and 3A are sectional views taken along lines 1A—1A, 2A—2A and 3A—3A respectively.

DESCRIPTION OF THE PREFERRED EMBODIMENTS

Figure 3:
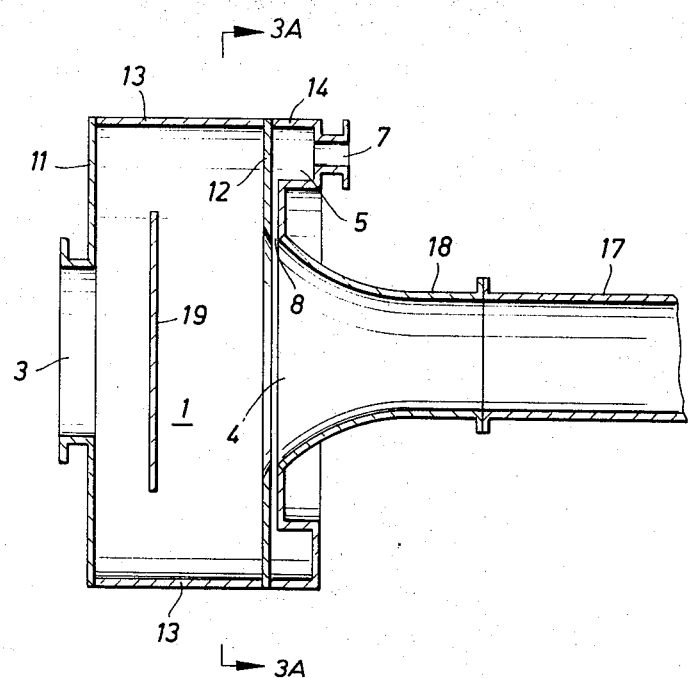
FIG. 3 shows a third embodiment in longitudinal section and cross section.
Figure 3A:
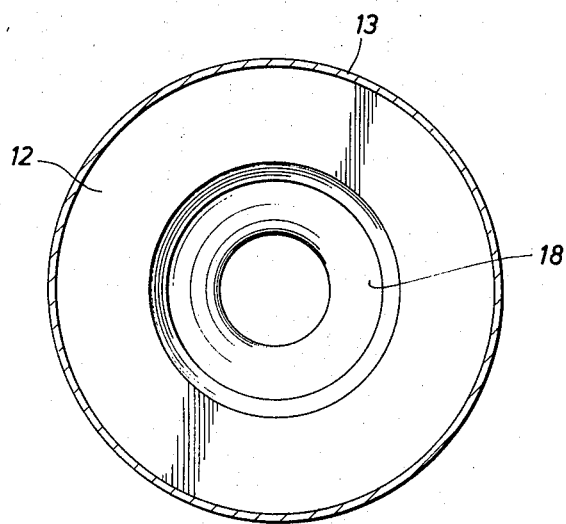

It has now been found that the transport can be carried out with the aid of a very thin annular water layer, even when the viscosity of the oil is low. Also, by applying higher velocities of flow the risk of the oil penetrating through the annular water layer and contacting the wall is decreased. The inlet piece can therefore very well be used in any position.

Owing to the high velocity of flow allowed in the exit of the first chamber, the cross-sectional area of that outlet is to a high degree independent of the cross-sectional area of the pipeline and may, for instance, lie within the range between 0.5 and 1.5 times the latter area. The connecting piece preferably has the shape of part of the curved surface of a cone.

The width of the annular outlet is preferably chosen such that the difference between the average velocities of outflow of the two liquids is less than 0.5 m/s. The ratio between the quantities of water and oil to be used in pumping oil through a pipeline may vary between wide limits. It is therefore impossible to relate the width of the annular outlet to the cross-sectional area of the exit. However, when starting from the desideratum, formulated hereinbefore, concerning the difference between the average velocities of outflow, someone skilled in the art will be perfectly able to determine the appropriate width of the annular outlet. Likewise, someone skilled in the art will be able to determine the dimensions and the design of the annular outlet and of the second chamber with respect to each other such that an annular water layer is obtained whose velocity of flow and thickness are substantially the same along its whole circumference.

A suitable inlet piece is obtained when the first chamber is bounded by a rotation-symmetrical wall in a coaxial position relative the pipeline, the cross-sectional area of the chamber, measured in the direction perpendicular to the perpendicular on the exit thereof, decreasing toward that exit. The accelerated motion of the oil flowing to the outlet is very effective in obtaining a uniform velocity profile.

A very simple design of the inlet piece becomes possible when the first chamber is bounded by a wall having the shape of part of the curved surface of a cone. In many applications a sufficiently large effect on the velocity profile is obtained when the angle between a generating line of the curved surface of the cone and the center line of that cone is at least 10°.

According to another suitable embodiment of the invention the first chamber is bounded by two flat walls which are substantially perpendicular to the perpendicular on the exit of that chamber, the distance between those walls amounting to at least half the diameter of the pipeline, and by a wall intersecting those two flat walls, in such a way that the dimension of that chamber in directions perpendicular to the perpendicular on the exit is at least twice the diameter of that exit. In this embodiment also an unimpeded flow of the oil to the outlet and a uniform velocity distribution over the cross-sectional area of that exit can be attained.

It may be useful for one or more resistances to be installed in the first chamber, close to the exit, which resistances promote a velocity of a liquid flowing through that outlet that is uniform over the cross-sectional area thereof. These resistances may, for instance, consist of grates or perforated plates. They may also be formed by a number of baffles placed in the direction of the perpendicular, which divide an oil flowing through the outlet into a number of subflows. In difficult cases these resistances can ensure a very uniform velocity distribution of the outflowing oil.

The invention further provides a process for the transport through a pipeline of a viscous liquid surrounded by an annular layer of liquid with a low viscosity, which liquids are entirely or substantially insoluble with respect to each other, in which process the two liquids are introduced with the aid of an inlet piece as described, the volume flow rate of the liquid with a low viscosity lying between the limits of 0.1 and 25 percent of the volume flow rate of the viscous liquid. Very favorable results are reached when the difference between the average velocities of outflow of the two liquids, respectively from the exit and from the outlet, is less than 0.5 m/s.

It is of great importance that oil can now be transported through a pipeline with only very small quantities of water. It has been found that the pressure drop involved is at most equal to that of water at the same average velocity of flow, irrespective of the viscosity of the oil. In many cases the pressure drop even amounts to only 60–80 percent thereof. This is a result of the absence of currents or vortices in the central core, which is now occupied by less mobile or even stiff oil. Formation of drops of oil in water does not occur, not even in the case of oils with a low viscosity, such as, for instance, 100 cSt. The process according to the invention thus offers the following possibilities and advantages:

Very viscous oils which without this process could not be transported can now be pumped with very little water. Oils which at normal temperature are very viscous are often supplied at a comparatively high temperature, the viscosity in the initial part of the pumping process thus being low. Notwithstanding this low viscosity, introduction with a surrounding annular layer of water without the occurrence of drop formation can now be effected by the apparatus and the process according to the invention, while no problems for the transport arise from the drop in temperature farther on in the pipeline. Also, oils with a low viscosity can now be transported by the process according to the invention, which implies that the capacity of the pipeline can be increased considerably, since the pressure drop in the pipeline is at most equal to that of water at the same average velocity of flow, while the required volume of water relative to the quantity of oil transported by pumping can be negligibly small.

In FIG. 1 item 1 represents the first chamber bounded by the wall 2, formed by part of the curved surface of a cone; the chamber is provided with an inlet for oil 3 and exit for oil 4. A second chamber 5 is so positioned as to surround the first chamber; this second chamber is bounded on the inside by a part of the wall 2 and on the outside by the wall 6, and is provided with an inlet 7 and with an annular outlet 8. By means of the conical connecting piece 9 the inlet piece is connected to the pipeline 10.

In FIGS. 2 and 3 item 1 represents the first chamber; this chamber is bounded by two flat walls 11 and 12 and the curved wall 13. In the wall 12 there is a circular exit 4. Next to the first chamber 5, which is bounded on one side by the flat wall 12 in which there is the exit 4, and on the other side by the wall 14. The chamber 5 is provided with an inlet 7 an annular outlet 8 which surrounds the circular exit 4.

In FIG. 2 the first chamber 1 has two inlets 3, which are located in the curved wall 13. In the exit 4 there is located a perforated plate 15. By means of the cylindrical connecting piece 16 the inlet piece is connected to the pipeline 17.

In FIG. 3 the first chamber has a inlet 3 which is located in the flat wall 11. Inside that chamber a baffle 19 has been installed for deflecting the liquid. The connecting piece 18 which forms the connection to the pipeline 17 has the shape of a trumpet.

I claim as my invention:

1. Apparatus for transporting a viscous oil through a pipeline by the introduction of a surrounding annular layer of water about the oil without the occurrence of oil drop formation within the water layer, comprising, a first chamber bounded by two flat walls and a curved wall having two opposed oil inlets, one of the flat walls having a circular exit for the oil with a perforated plate located therein, a second chamber next to the first chamber which is bounded on one side by the flat wall in which there is the oil exit and on the other side another wall, the second chamber being provided with a water inlet and having an annular water outlet which surrounds the circular oil exit, and a cylindrical connecting piece attached to the water outlet of the second chamber and connected to the pipeline.

* * * * *